United States Patent
Lin et al.

(10) Patent No.: US 12,143,982 B2
(45) Date of Patent: Nov. 12, 2024

(54) APPARATUS AND INFORMATION PROCESSING METHOD

(71) Applicant: GUANGDONG OPPO MOBILE TELECOMMUNICATIONS CORP., LTD., Dongguan (CN)

(72) Inventors: Hao Lin, Neuilly-sur-Seine (FR); Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 381 days.

(21) Appl. No.: 17/679,938

(22) Filed: Feb. 24, 2022

(65) Prior Publication Data

US 2022/0279548 A1    Sep. 1, 2022

Related U.S. Application Data

(63) Continuation of application No. PCT/CN2020/112259, filed on Aug. 28, 2020.
(Continued)

(51) Int. Cl.
*H04W 72/04* (2023.01)
*H04L 1/00* (2006.01)
(Continued)

(52) U.S. Cl.
CPC ....... *H04W 72/1263* (2013.01); *H04L 1/0003* (2013.01); *H04L 1/1812* (2013.01);
(Continued)

(58) Field of Classification Search
None
See application file for complete search history.

(56) References Cited

U.S. PATENT DOCUMENTS

| 11,974,283 B2* | 4/2024 | Saggar | H04L 1/0025 |
| 2019/0159193 A1* | 5/2019 | Zhang | H04L 5/0048 |

(Continued)

FOREIGN PATENT DOCUMENTS

| CN | 108370297 A | 8/2018 |
| CN | 108988997 A | 12/2018 |

(Continued)

OTHER PUBLICATIONS

International Search Report and the Written Opinion Dated Dec. 2, 2020 From the International Searching Authority Re. Application No. PCT/CN2020/112259.
(Continued)

*Primary Examiner* — Sai Aung
(74) *Attorney, Agent, or Firm* — Quarles & Brady LLP

(57) ABSTRACT

An apparatus and an information processing method are provided. The method includes determining, by a user equipment, a cyclic shift sequence comprising N cyclic shifts according to a hybrid automatic repeat request acknowledgement (HARQ-ACK) information to be transmitted and/or a scheduling request (SR) to be transmitted, wherein a resource in a frequency domain used for transmitting the HARQ-ACK information to be transmitted and/or the SR to be transmitted is a target interlace, the target interlace comprises N physical resource blocks (PRBs), the N cyclic shifts have a one-to-one correspondence with the N PRBs, and N is an integer and greater than 1; generating, by the user equipment, a target physical uplink control channel (PUCCH) based on PUCCH format_0 according to the cyclic shift sequence; and transmitting, by the user equipment, the target PUCCH on the target interlace. This can maintain a low peak-to-average power ratio (PAPR) property.

24 Claims, 6 Drawing Sheets

Related U.S. Application Data

(60) Provisional application No. 62/893,461, filed on Aug. 29, 2019.

(51) Int. Cl.

| | | |
|---|---|---|
| *H04L 1/1812* | (2023.01) | |
| *H04L 5/00* | (2006.01) | |
| *H04L 27/26* | (2006.01) | |
| *H04W 72/0453* | (2023.01) | |
| *H04W 72/12* | (2023.01) | |
| *H04W 72/1263* | (2023.01) | |

(52) U.S. Cl.
CPC ........ *H04L 5/0053* (2013.01); *H04L 27/2607* (2013.01); *H04L 27/2614* (2013.01); *H04W 72/0453* (2013.01)

(56) References Cited

U.S. PATENT DOCUMENTS

| | | | |
|---|---|---|---|
| 2020/0067680 A1* | 2/2020 | Nayeb Nazar | H04L 1/1692 |
| 2020/0195387 A1* | 6/2020 | Matsumura | H04L 5/0055 |
| 2020/0344099 A1* | 10/2020 | Sahin | H04L 27/2607 |
| 2021/0297966 A1* | 9/2021 | Noh | H04L 27/26025 |

FOREIGN PATENT DOCUMENTS

| | | |
|---|---|---|
| WO | 2019031954 A1 | 2/2019 |
| WO | 2019160354 A1 | 8/2019 |
| WO | 2019160809 A2 | 8/2019 |

OTHER PUBLICATIONS

ZTE sPUCCH format design 3GPP TSG RAN WG1 Meeting #90; R1-1712326. Aug. 25, 2017. section 2.1.3.
Ericsson Enhanced PUCCH design details, 3GPP TSG-RAN WG1 Meeting #97; R1-1907460. May 17, 2019. the whole document.
The supplementary European search report dated Aug. 9, 2022 from European patent Application No. 20856331.2.
Qualcomm Incorporated: "UL signals and channels for NR-U", 3GPP Draft; R1-1909244; Aug. 17, 2019 (Aug. 17, 2019), section 3.1.1.
Vivo: "Evaluation on PAPR/CM for enhanced PUCCH format 0 and format 1 for NRU", 3GPP Draft; R1-1908145; Aug. 17, 2019 (Aug. 17, 2019), section 2.
Samsung: "Uplink signal and channel design for NR-U", 3GPP Draft; R1-1908464; Aug. 16, 2019 (Aug. 16, 2019), section 2.
LG Electronics: "Physical layer design of UL signals and channels for NR-U", 3GPP Draft; R1-1908534; Aug. 17, 2019 (Aug. 17, 2019), sections 1, 2.1, 2.2.

* cited by examiner

300 ⟶

302 ⟶ Performing, by a user equipment, a generation process of an interlaced control channel, wherein the generation process of the interlaced control channel comprises at least one of the followings: determining a first cyclic shift member in a group; determining a cyclic shift group; or a cyclic shift group sequence to interlace mapping

FIG. 3

APPARATUS AND INFORMATION PROCESSING METHOD

CROSS REFERENCE TO RELATED APPLICATIONS

This application is a continuation of International Application No. PCT/CN2020/112259, filed on Aug. 28, 2020 and claims the benefits of U.S. provisional application No. 62/893,461, field on Aug. 29, 2019. The entire disclosures of these applications are incorporated herein by reference.

BACKGROUND OF DISCLOSURE

1. Field of the Disclosure

The present disclosure relates to the field of communication systems, and more particularly, to an apparatus and an information processing method, which can provide a good communication performance and high reliability.

2. Description of the Related Art

Wireless communication systems are widely deployed to provide various types of communication content such as voice, data, and so on. The wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd generation partnership project (3GPP) long term evolution (LTE) systems, and orthogonal frequency division multiple access (OFDMA) systems.

In an unlicensed band, an unlicensed spectrum is a shared spectrum. Communication equipments in different communication systems can use the unlicensed spectrum as long as the unlicensed meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum. For example, a communication device follows a listen before talk (LBT) procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT).

On an unlicensed carrier, for a channel occupation time obtained by a base station, it may share the channel occupation time to a user equipment (UE) for transmitting an uplink signal or an uplink channel. In other words, when the base station shares its own channel occupancy time with the UE, the UE can use an LBT mode with higher priority than that used by the UE itself to obtain the channel, thereby obtaining the channel with greater probability.

In new radio-based access to unlicensed spectrum (NRU), a wideband operation can be configured and a configured active bandwidth part (BWP) can include resource block sets (RB sets). Physical uplink control channel (PUCCH) resource allocation in terms of an RB set and an interlace is not fully designed and is still an open issue.

In addition, in an NRU wideband operation, a BS (such as gNB) and a UE can operate in a wider band including RB sets. NR release 15 has defined a BWP concept, thus in a context of the NRU wideband operation, the UE can be configured with an active BWP including multiple RB sets. Multiple RB sets can be assigned by the gNB to the UE for uplink transmission, e.g. a physical uplink control channel (PUCCH) transmission. However, by regulation, priori to each transmission in the spectrum, a sender needs to perform the LBT procedure.

In a current interlaced control channel, how to design a generation process of an interlaced control channel with a low peak to average power ratio (PAPR) property is still an open issue. Therefore, there is a need for a user equipment (UE) and a method of communication of the same, which can solve issues in the prior art, provide a generation process of an interlaced control channel and further maintain a low peak to average power ratio (PAPR) property.

SUMMARY

An object of the present disclosure is to propose an apparatus such as a user equipment (UE) and/or a base station (BS) and a method of communication of the same, which can solve issues in the prior art, provide a generation process of an interlaced control channel and further maintain a low peak to average power ratio (PAPR) property.

In a first aspect of the present disclosure, an information processing method includes determining, by a user equipment, a cyclic shift sequence comprising N cyclic shifts according to a hybrid automatic repeat request acknowledgement (HARQ-ACK) information to be transmitted and/or a scheduling request (SR) to be transmitted, wherein a resource in a frequency domain used for transmitting the HARQ-ACK information to be transmitted and/or the SR to be transmitted is a target interlace, the target interlace comprises N physical resource blocks (PRBs), the N cyclic shifts have a one-to-one correspondence with the N PRBs, and N is an integer and greater than 1, a block 404, generating, by the user equipment, a target physical uplink control channel (PUCCH) based on PUCCH format_0 according to the cyclic shift sequence, and a block 406, transmitting, by the user equipment, the target PUCCH on the target interlace.

In a second aspect of the present disclosure, an information processing method includes parsing, by a base station, a target physical uplink control channel (PUCCH) on a target interlace based on PUCCH format_0 according to a cyclic shift sequence comprising N cyclic shifts; obtaining, by the base station, modulation and coding scheme (MCS)-0 by parsing the cyclic shift sequence; and obtaining, by the base station, a hybrid automatic repeat request acknowledgement (HARQ-ACK) information and/or a scheduling request (SR) on the PUCCH, wherein a resource in a frequency domain used for transmitting the HARQ-ACK information and/or the SR is the target interlace, the target interlace comprises N physical resource blocks (PRBs), the N cyclic shifts have a one-to-one correspondence with the N PRBs, and N is an integer and greater than 1.

In a third aspect of the present disclosure, a user equipment includes a memory, a transceiver, and a processor coupled to the memory and the transceiver. The processor is configured to determine a cyclic shift sequence comprising N cyclic shifts according to a hybrid automatic repeat request acknowledgement (HARQ-ACK) information to be transmitted and/or a scheduling request (SR) to be transmitted, wherein a resource in a frequency domain used for transmitting the HARQ-ACK information to be transmitted and/or the SR to be transmitted is a target interlace, the target interlace comprises N physical resource blocks (PRBs), the N cyclic shifts have a one-to-one correspondence with the N PRBs, and N is an integer and greater than 1. The processor is configured to generate a target physical uplink control channel (PUCCH) based on PUCCH format_0 according to the cyclic shift sequence. The transceiver is configured to transmit the target PUCCH on the target interlace.

In a fourth aspect of the present disclosure, a base station includes a memory, a transceiver, and a processor coupled to the memory and the transceiver. The processor is configured to: parse a target physical uplink control channel (PUCCH) on a target interlace based on PUCCH format_0 according to a cyclic shift sequence comprising N cyclic shifts; obtain modulation and coding scheme (MCS)-0 by parsing the cyclic shift sequence; and obtain a hybrid automatic repeat request acknowledgement (HARQ-ACK) information and/or a scheduling request (SR) on the PUCCH, wherein a resource in a frequency domain used for transmitting the HARQ-ACK information and/or the SR is the target interlace, the target interlace comprises N physical resource blocks (PRBs), the N cyclic shifts have a one-to-one correspondence with the N PRBs, and N is an integer and greater than 1.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

FIG. 3 is a flowchart illustrating a method of communication of a UE according to an embodiment of the present disclosure.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
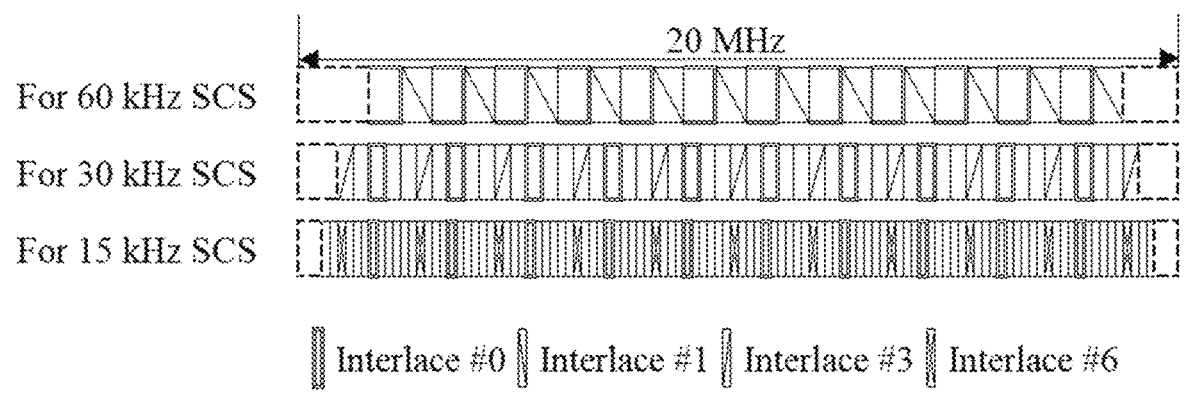
FIG. 1 is a schematic diagram illustrating an interlaced structure for an uplink channel transmission.

FIG. 1 illustrates an interlaced structure for an uplink channel transmission. In new radio-based access to unlicensed spectrum (NRU) physical uplink control channel (PUCCH) interlace, in an unlicensed band in 5G Hz, a regulation imposes that if a transmitter wants to operate transmission in a channel, the transmission has to occupy at least 80% of a channel bandwidth. With this restriction, NRU decided to adopt an interlaced structure for two uplink channel transmissions, they are PUCCH and physical uplink shared channel (PUSCH). Each interlace structure will have specific number of physical resource block (PRB). Between each of the consecutive PRB pairs, there is M PRB further apart. For example, in a 20 MHz bandwidth and for 30 kHz subcarrier spacing (SCS) case, 1 interlace has 10 or 11 PRBs and M=5.

In new radio (NR) release 15, a PUCCH format 0 is generated from a specified computer generated sequence (CGS) of length 12, i.e., S(n), n=0, . . . , 11, which possesses a very low peak to average power ratio (PAPR) property. This channel can carrier up to 2-bit positive-acknowledgement (ACK)/negative-acknowledgement (NACK) information together with scheduling request (SR) indication. The ACK/NACK information is presented by a cyclic shift (CS), additionally introduced on top of the CGS. There are 12 possible CSs, i.e. $m_{cs}$=0, . . . , 11. The cyclic shifted sequence is given by $$S_{cs}(n) = e^{\frac{j\pi}{6}\alpha n} \cdot S(n),$$

n=0, . . . , 11, where α is a phase rotation depending on the selected CS $m_{cs}$ The ACK/NACK information is tightly bounded with the $m_{cs}$ value, which is specified in NR release 15, 38.213 section 9.2.3 and section 9.2.5.1. The PUCCH format 0 occupies 1 PRB in frequency domain (12 subcarriers) and 1 or 2 orthogonal frequency division multiplexing (OFDM) symbols in time domain.

As can be seen from the above, α is actually a cyclic shift through which a PUCCH transmitted on an interlace can be generated.

In the latest version f60 of new radio (NR) standard R15 38.211, the standard discloses the following in the chapter 6.3.2.2.2 cyclic shift hopping:

The cyclic shift α varies as a function of the symbol and slot number according to $$\alpha_l = \frac{2\pi}{N_{sc}^{RB}}\left(\left(m_0 + m_{cs} + n_{cs}\left(n_{s,f}^{\mu},\ l+l'\right)\right) \bmod N_{sc}^{RB}\right),$$

where $n_{s,f}^{\mu}$ is the slot number in the radio frame, l is the OFDM symbol number in the PUCCH transmission where l=0 corresponds to the first OFDM symbol of the PUCCH transmission, l' is the index of the OFDM symbol in the slot that corresponds to the first OFDM symbol of the PUCCH transmission in the slot given by [5, TS 38.213], $m_0$ is given by [5, TS 38.213] for PUCCH format 0 and 1 while for PUCCH format 3 and 4 is defined in subclause 6.4.1.3.3.1, and $m_{cs}$=0 except for PUCCH format 0 when it depends on the information to be transmitted according to subclause 9.2 of [5, TS 38.213].

The function $n_{cs}(n_c,l)$ is given by $n_{cs}(n_{s,f}^{\mu},l)=\Sigma_{m=0}^{7}2^m c$ $(8N_{symb}^{slot}n_{s,f}^{\mu}+8l+m)$, where the pseudo-random sequence c(i) is defined by subclause 5.2.1. The pseudo-random sequence generator shall be initialized with $c_{init}=n_{ID}$, where $n_{ID}$ is given by the higher-layer parameter hoppingId if configured, otherwise $n_{ID}=N_{ID}^{cell}$.

The NR release15 PUCCH format 0 occupies only 1 PRB in frequency domain; while in new radio-based access to unlicensed spectrum (NRU), an interlaced structure should be implemented, so that PUCCH format 0 can be transmitted on multiple PRBs (such as 10 or 11 PRBs) in an interlace. If PUCCH format 0 simply repeats transmission on each of the PRBs multiple times, the content transmitted on each of the PRBs has the same cyclic shift. A simple repetition of NR release 15 PUCCH format 0 in each of the PRBs of an interlace will cause a very high peak to average power ratio (PAPR) issue. Thus, an enhancement should be done for this new design of PUCCH format 0 in NRU systems.

Because the simple repetition of PUCCH format 0 on each of the PRBs in the interlace will cause the PAPR issue, some embodiments of the present disclosure provide a method of designing an NRU PUCCH format 0. Some embodiments of the present disclosure further provide technical solutions to resolve this issue. In some embodiments of the present disclosure, PUCCH format 0 on each of the PRBs is given as different cyclic shift as possible, so that data in each of the PRBs is no longer completely the same, and the high PAPR issue can be avoided as much as possible.

Figure 2:
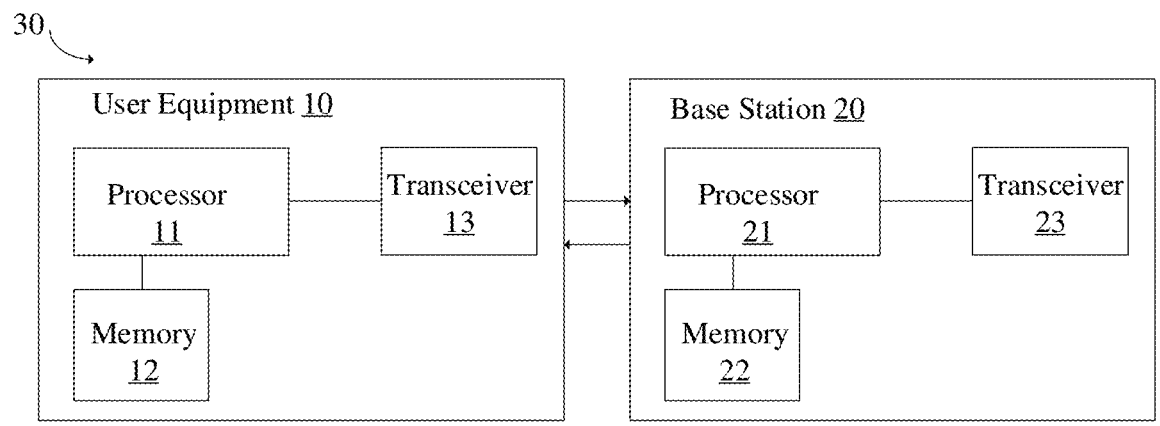
FIG. 2 is a block diagram of a user equipments (UE) and a base station (BS) (e.g., gNB) of communication in a communication network system according to an embodiment of the present disclosure.

FIG. 2 illustrates that, in some embodiments, a user equipment (UE) 10 and a base station (BS) (e.g., gNB) 20 of communication in a communication network system 30 according to an embodiment of the present disclosure are provided. The communication network system 30 includes one or more UEs 10 of a cell and the BS 20. The UE 10 may include a memory 12, a transceiver 13, and a processor 11 coupled to the memory 12, the transceiver 13. The base station 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of first information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured to determine a cyclic shift sequence comprising N cyclic shifts according to a hybrid automatic repeat request acknowledgement (HARQ-ACK) information to be transmitted and/or a scheduling request (SR) to be transmitted, wherein a resource in a frequency domain used for transmitting the HARQ-ACK information to be transmitted and/or the SR to be transmitted is a target interlace, the target interlace comprises N physical resource blocks (PRBs), the N cyclic shifts have a one-to-one correspondence with the N PRBs, and N is an integer and greater than 1. The processor 11 is configured to generate a target physical uplink control channel (PUCCH) based on PUCCH format_0 according to the cyclic shift sequence. The transceiver 13 is configured to transmit the target PUCCH on the target interlace. This can solve issues in the prior art, provide a generation process of an interlaced control channel and further maintain a low peak-to-average power ratio (PAPR) property. Further, PUCCH format 0 on each of the PRBs is given as different cyclic shift as possible, so that data in each of the PRBs is no longer completely the same, and the high PAPR issue can be avoided as much as possible.

In some embodiments, the processor 21 is configured to: parse a target physical uplink control channel (PUCCH) on a target interlace based on PUCCH format_0 according to a cyclic shift sequence comprising N cyclic shifts; obtain modulation and coding scheme (MCS)-0 by parsing the cyclic shift sequence; and obtain a hybrid automatic repeat request acknowledgement (HARQ-ACK) information and/or a scheduling request (SR) on the PUCCH, wherein a resource in a frequency domain used for transmitting the HARQ-ACK information and/or the SR is the target interlace, the target interlace comprises N physical resource blocks (PRBs), the N cyclic shifts have a one-to-one correspondence with the N PRBs, and N is an integer and greater than 1. This can solve issues in the prior art, provide a generation process of an interlaced control channel and further maintain a low peak-to-average power ratio (PAPR) property. Further, PUCCH format 0 on each of the PRBs is given as different cyclic shift as possible, so that data in each of the PRBs is no longer completely the same, and the high PAPR issue can be avoided as much as possible.

In some embodiments, the N cyclic shifts are in sequence from $\alpha_0$ to $\alpha_{N-1}$, and the N PRBs are in sequence from $PRB_0$ to $PRB_{N-1}$; and the one-to-one correspondence between the N cyclic shifts and the N PRBs comprises: $\alpha_i$ in the cyclic shift sequence corresponds to $PRB_i$ in the N PRBs, and a value range of i is [0, N−1]. In some embodiments, the cyclic shift sequence is obtained from $m_{cs}$ parameter sequence, the $m_{cs}$ parameter sequence comprises N $m_{cs}$ parameters, and the N cyclic shifts have a one-to-one correspondence with the N $m_{cs}$ parameters. In some embodiments, the N $m_{cs}$ parameters are in sequence from $m_{cs}^{0}$ to $m_{cs}^{N-1}$, the one-to-one correspondence between the N cyclic shifts and the N $m_{cs}$ parameters comprises: $\alpha_i$ in the cyclic shift sequence corresponds to $m_{cs}^i$ in the $m_{cs}$ parameter sequence, and a value range of i is [0, N−1]. In some embodiments, the SR comprises one of the followings: a negative SR or a positive SR.

In some embodiments, a starting element of the $m_{cs}$ parameter sequence is $m_{cs}^0$, and a value of $m_{cs}^0$ is associated with the HARQ-ACK information and/or the SR. In some embodiments, if a length of the HARQ-ACK information is 1 bit and a value is 0, or the SR is a negative SR and the length of the HARQ-ACK information is 1 bit and the value is 0, the value of $m_{cs}^0$ is 0; and if the length of the HARQ-ACK information is 1 bit and the value is 1, or the SR is the negative SR and the length of the HARQ-ACK information is 1 bit and the value is 1, the value of $m_{cs}^0$ is 6. In some embodiments, if a length of the HARQ-ACK information is 2 bits and a value is {0, 0}, or the SR is a negative SR and the length of the HARQ-ACK information is 2 bits and the value is {0, 0}, the value of $m_{cs}^0$ is 0; if the length of the HARQ-ACK information is 2 bits and the value is {0, 1}, or the SR is the negative SR and the length of the HARQ-ACK information is 2 bits and the value is {0, 1}, the value of $m_{cs}^0$ is 3; if the length of the HARQ-ACK information is 2 bits and the value is {1, 1}, or the SR is the negative SR and the length of the HARQ-ACK information is 2 bits and the value is {1, 1}, the value of $m_{cs}^0$ is 6; and if the length of the HARQ-ACK information is 2 bits and the value is {1, 0}, or the SR is the negative SR and the length of the HARQ-ACK information is 2 bits and the value is {1, 0}, the value of $m_{cs}^0$ is 9.

In some embodiments, if the SR is a positive SR, and a length of the HARQ-ACK information is 1 bit and a value is 0, the value of $m_{cs}^0$ is 3; and if the SR is the positive SR, and the length of the HARQ-ACK information is 1 bit and the value is 1, the value of $m_{cs}^0$ is 9. In some embodiments, if the SR is a positive SR, and a length of the HARQ-ACK information is 2 bits and a value is {0, 0}, the value of $m_{cs}^0$ is 1; if the SR is the positive SR, and the length of the HARQ-ACK information is 2 bits and the value is {0, 1}, the value of $m_{cs}^0$ is 4; if the SR is the positive SR, and the length of the HARQ-ACK information is 2 bits and the value is {1, 1}, the value of $m_{cs}^0$ is 7; and if the SR is the positive SR, and the length of the HARQ-ACK information is 2 bits and the value is {1, 0}, the value of $m_{cs}^0$ is 10. In some embodiments, adjacent elements in the $m_{cs}$ parameter sequence are set at equal intervals, a value of the interval is T, and T is an integer relatively prime to 12. In some embodiments, T is equal to 5. In some embodiments, $m_{cs}^i$= ($m_{cs}^0$+iT)mod 12. In some embodiments, N is equal to 10 or 11.

In some embodiments, the processor 11 is configured to perform a generation process of an interlaced control channel, wherein the generation process of the interlaced control channel comprises at least one of the followings: determining a first cyclic shift member in a group; determining a cyclic shift group; or a cyclic shift group sequence to interlace mapping. This can solve issues in the prior art, provide a generation process of an interlaced control channel and further maintain a low peak-to-average power ratio (PAPR) property.

In some embodiments, determining the first cyclic shift member in the group is relevant to a positive-acknowledgement (ACK) information and/or a negative-acknowledgement (NACK) information. In some embodiments, determining the cyclic shift group is for a pair of ACK information, NACK information, and scheduling request (SR) information. In some embodiments, the ACK information corresponds to a first cyclic shift group, and the NACK information corresponds to a second cyclic shift group. In some embodiments, the first cyclic shift group and the second cyclic shift group have at least one different cyclic shift member in the group. In some embodiments, the first cyclic shift group and the second cyclic shift group have different cyclic shift member orderings. In some embodiments, the first cyclic shift group and the second cyclic shift group have the same cyclic shift members but with different cyclic shift member orderings.

In some embodiments, for a transmission of the ACK information and the SR information, the transmission of the ACK information and the SR information corresponds to a third cyclic shift group which is obtained from the first cyclic shift group, such that the first cyclic shift group and the third cyclic shift group have the same cyclic shift members but different cyclic shift member orderings. In some embodiments, for a transmission of the NACK information and the SR information, the transmission of the NACK information and the SR information corresponds to a fourth cyclic shift group which is obtained from the second cyclic shift group, such that the second cyclic shift group and the fourth cyclic shift group have the same cyclic shift members but different cyclic shift member orderings.

In some embodiments, if the transceiver 13 transmits 1-bit hybrid automatic repeat request acknowledgement (HARQ-ACK) value 0 or 1-bit HARQ-ACK value 0 and a negative SR information, the processor 11 determines a first cyclic shift group, where a first cyclic shift member of a first cyclic shift group has value 0. In some embodiments, if the transceiver transmits 13 1-bit HARQ-ACK value 1 or 1-bit HARQ-ACK value 1 and a negative SR information, the processor 11 determines a second cyclic shift group, where a first cyclic shift member of a second cyclic shift group has value 6. In some embodiments, if the transceiver 13 transmits 2-bit HARQ-ACK value {0,0} or 2-bit HARQ-ACK value {0,0} and a negative SR information, the processor 11 determines a third cyclic shift group, where a first cyclic shift member of a third cyclic shift group has value 0. In some embodiments, if the transceiver 13 transmits 2-bit HARQ-ACK value {0,1} or 2-bit HARQ-ACK value {0,1} and a negative SR information, the processor 11 determines a fourth cyclic shift group, where a first cyclic shift member of a fourth cyclic shift group has value 3.

In some embodiments, if the transceiver 13 transmits 2-bit HARQ-ACK value {1,1} or 2-bit HARQ ACK value {1,1} and a negative SR information, the processor 11 determines a fifth cyclic shift group, where a first cyclic shift member of the fifth cyclic shift group has value 6. In some embodiments, if the transceiver 13 transmits 2-bit HARQ-ACK value {1,0} or 2-bit HARQ ACK value {1,0} and a negative SR information, the processor 11 determines a sixth cyclic shift group, where a first cyclic shift member of the sixth cyclic shift group has value 9. In some embodiments, if the transceiver 13 transmits 1-bit HARQ ACK value 0 and a positive SR information, the processor 11 determines a seventh cyclic shift group, where a first cyclic shift member of the seventh cyclic shift group has value 0 or value 3. In some embodiments, if the transceiver 13 transmits 1-bit HARQ ACK value 1 and a positive SR information, the processor 11 determines an eighth cyclic shift group, where a first cyclic shift member of the eighth cyclic shift group has value 6 or value 9.

In some embodiments, if the transceiver 13 transmits 2-bit HARQ ACK value {0,0} and a positive SR information, the processor 11 determines a ninth cyclic shift group, where a first cyclic shift member of the ninth cyclic shift group has value 0 or value. In some embodiments, if the transceiver 13 transmits 2-bit HARQ ACK value {0,1} and a positive SR information, the processor 11 determines a tenth cyclic shift group, where a first cyclic shift member of the tenth cyclic shift group has value 3 or value 4. In some embodiments, if the transceiver 13 transmits 2-bit HARQ ACK value {1,1} and a positive SR information, the processor 11 determines an eleventh cyclic shift group #11, where a first cyclic shift member of the eleventh cyclic shift group has value 6 or value 7. In some embodiments, if the transceiver 13 transmits 2-bit HARQ ACK value {1,0} and a positive SR information, the processor 11 determines a twelfth cyclic shift group, where a first cyclic shift member of the twelfth cyclic shift group has value 9 or value 10.

FIG. 3 illustrates a method 300 of communication of a UE according to an embodiment of the present disclosure. In some embodiments, the method 300 includes: a block 302, performing, by the UE, a generation process of an interlaced control channel, wherein the generation process of the interlaced control channel comprises at least one of the followings: determining a first cyclic shift member in a group; determining a cyclic shift group; or a cyclic shift group sequence to interlace mapping. This can solve issues in the prior art, provide a generation process of an interlaced control channel and further maintain a low peak-to-average power ratio (PAPR) property.

Figure 4:
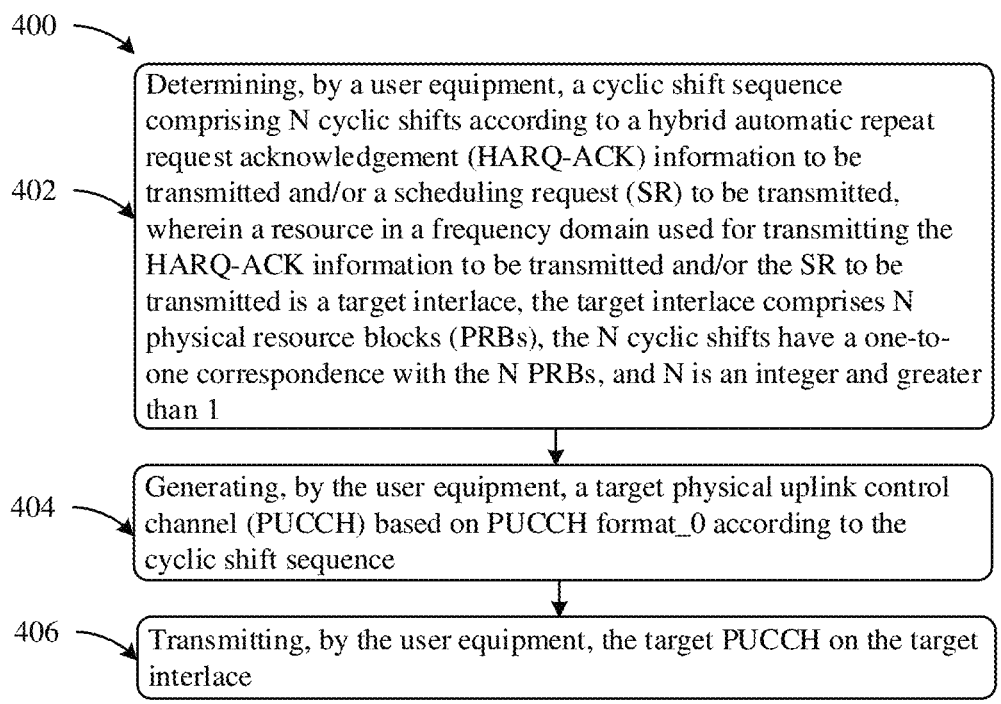
FIG. 4 is a flowchart illustrating an information processing method of a UE according to an embodiment of the present disclosure.

FIG. 4 illustrates an information processing method 400 of a UE according to an embodiment of the present disclosure. In some embodiments, the method 400 includes: a block 402, determining, by a user equipment, a cyclic shift sequence comprising N cyclic shifts according to a hybrid automatic repeat request acknowledgement (HARQ-ACK) information to be transmitted and/or a scheduling request (SR) to be transmitted, wherein a resource in a frequency domain used for transmitting the HARQ-ACK information to be transmitted and/or the SR to be transmitted is a target interlace, the target interlace comprises N physical resource blocks (PRBs), the N cyclic shifts have a one-to-one correspondence with the N PRBs, and N is an integer and greater than 1, a block 404, generating, by the user equipment, a target physical uplink control channel (PUCCH) based on PUCCH format_0 according to the cyclic shift sequence, and a block 406, transmitting, by the user equipment, the target PUCCH on the target interlace. This can solve issues in the prior art, provide a generation process of an interlaced control channel and further maintain a low peak-to-average power ratio (PAPR) property. Further, PUCCH format 0 on each of the PRBs is given as different cyclic shift as possible, so that data in each of the PRBs is no longer completely the same, and the high PAPR issue can be avoided as much as possible.

Figure 5:
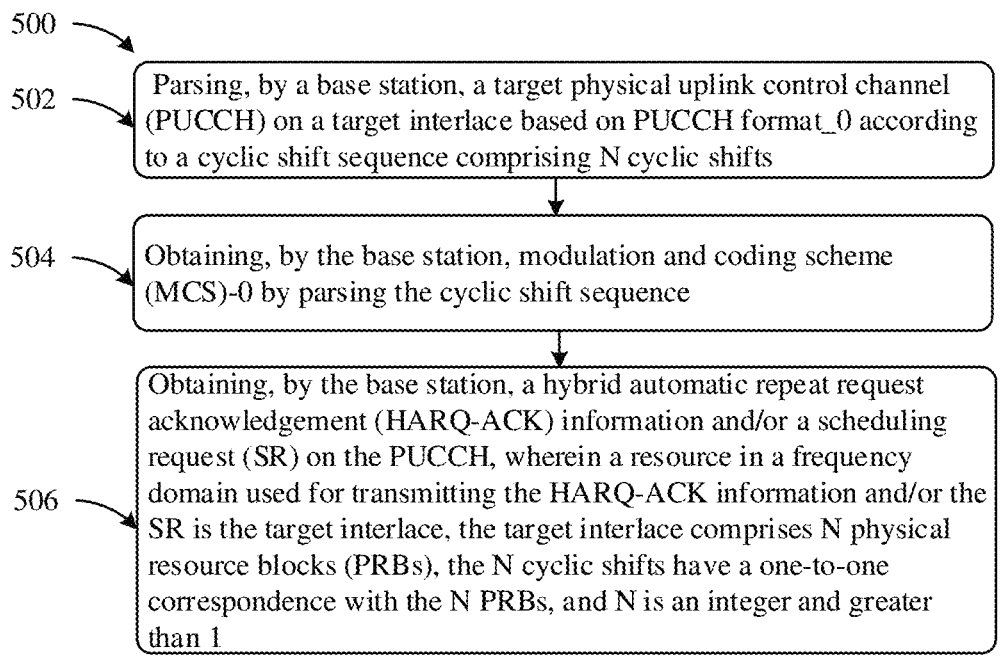
FIG. 5 is a flowchart illustrating an information processing method of a BS according to an embodiment of the present disclosure.

FIG. 5 illustrates an information processing method 500 of a BS according to an embodiment of the present disclosure. In some embodiments, the method 500 includes: a block 502, parsing, by a base station, a target physical uplink control channel (PUCCH) on a target interlace based on PUCCH format_0 according to a cyclic shift sequence comprising N cyclic shifts, a block 504, obtaining, by the base station, modulation and coding scheme (MCS)-0 by parsing the cyclic shift sequence, and a block 406, obtaining, by the base station, a hybrid automatic repeat request acknowledgement (HARQ-ACK) information and/or a scheduling request (SR) on the PUCCH, wherein a resource in a frequency domain used for transmitting the HARQ-ACK information and/or the SR is the target interlace, the target interlace comprises N physical resource blocks (PRBs), the N cyclic shifts have a one-to-one correspondence with the N PRBs, and N is an integer and greater than 1. This can solve issues in the prior art, provide a generation process of an interlaced control channel and further maintain a low peak-to-average power ratio (PAPR) property. Further, PUCCH format 0 on each of the PRBs is given as different cyclic shift as possible, so that data in each of the PRBs is no longer completely the same, and the high PAPR issue can be avoided as much as possible.

In some embodiments, the N cyclic shifts are in sequence from $\alpha_0$ to $\alpha_{N-1}$, and the N PRBs are in sequence from $PRB_0$ to $PRB_{N-1}$; and the one-to-one correspondence between the N cyclic shifts and the N PRBs comprises: $\alpha_i$ in the cyclic shift sequence corresponds to $PRB_i$ in the N PRBs, and a value range of i is [0, N−1]. In some embodiments, the cyclic shift sequence is obtained from $m_{cs}$ parameter sequence, the $m_{cs}$ parameter sequence comprises N $m_{cs}$ parameters, and the N cyclic shifts have a one-to-one correspondence with the N $m_{cs}$ parameters. In some embodiments, the N $m_{cs}$ parameters are in sequence from $m_{cs}^0$ to $m_{cs}^{N-1}$, the one-to-one correspondence between the N cyclic shifts and the N $m_{cs}$ parameters comprises: $\alpha_i$ in the cyclic shift sequence corresponds to $m_{cs}^i$ in the $m_{cs}$ parameter sequence, and a value range of i is [0, N−1]1. In some embodiments, the SR comprises one of the followings: a negative SR or a positive SR.

In some embodiments, a starting element of the $m_{cs}$ parameter sequence is $m_{cs}^0$, and a value of $m_{cs}^0$ is associated with the HARQ-ACK information and/or the SR. In some embodiments, if a length of the HARQ-ACK information is 1 bit and a value is 0, or the SR is a negative SR and the length of the HARQ-ACK information is 1 bit and the value is 0, the value of $m_{cs}^0$ is 0; and if the length of the HARQ-ACK information is 1 bit and the value is 1, or the SR is the negative SR and the length of the HARQ-ACK information is 1 bit and the value is 1, the value of $m_{cs}^0$ is 6. In some embodiments, if a length of the HARQ-ACK information is 2 bits and a value is {0, 0}, or the SR is a negative SR and the length of the HARQ-ACK information is 2 bits and the value is {0, 0}, the value of $m_{cs}^0$ is 0; if the length of the HARQ-ACK information is 2 bits and the value is {0, 1}, or the SR is the negative SR and the length of the HARQ-ACK information is 2 bits and the value is {0, 1}, the value of $m_{cs}^0$ is 3; if the length of the HARQ-ACK information is 2 bits and the value is {1, 1}, or the SR is the negative SR and the length of the HARQ-ACK information is 2 bits and the value is {1, 1}, the value of $m_{cs}^0$ is 6; and if the length of the HARQ-ACK information is 2 bits and the value is {1, 0}, or the SR is the negative SR and the length of the HARQ-ACK information is 2 bits and the value is {1, 0}, the value of $m_{cs}^0$ is 9.

In some embodiments, if the SR is a positive SR, and a length of the HARQ-ACK information is 1 bit and a value is 0, the value of $m_{cs}^0$ is 3; and if the SR is the positive SR, and the length of the HARQ-ACK information is 1 bit and the value is 1, the value of $m_{cs}^0$ is 9. In some embodiments, if the SR is a positive SR, and a length of the HARQ-ACK information is 2 bits and a value is {0, 0}, the value of $m_{cs}^0$ is 1; if the SR is the positive SR, and the length of the HARQ-ACK information is 2 bits and the value is {0, 1}, the value of $m_{cs}^0$ is 4; if the SR is the positive SR, and the length of the HARQ-ACK information is 2 bits and the value is {1, 1}, the value of $m_{cs}^0$ is 7; and if the SR is the positive SR, and the length of the HARQ-ACK information is 2 bits and the value is {1, 0}, the value of $m_{cs}^0$ is 10. In some embodiments, adjacent elements in the $m_{cs}$ parameter sequence are set at equal intervals, a value of the interval is T, and T is an integer relatively prime to 12. In some embodiments, T is equal to 5. In some embodiments, $m_{cs}^i = (m_{cs}^0+iT) \mod 12$. In some embodiments, N is equal to 10 or 11.

In some embodiments, determining the first cyclic shift member in the group is relevant to a positive-acknowledgement (ACK) information and/or a negative-acknowledgement (NACK) information. In some embodiments, determining the cyclic shift group is for a pair of ACK information, NACK information, and scheduling request (SR) information. In some embodiments, the ACK information corresponds to a first cyclic shift group, and the NACK information corresponds to a second cyclic shift group. In some embodiments, the first cyclic shift group and the second cyclic shift group have at least one different cyclic shift member in the group. In some embodiments, the first cyclic shift group and the second cyclic shift group have different cyclic shift member orderings. In some embodiments, the first cyclic shift group and the second cyclic shift group have the same cyclic shift members but with different cyclic shift member orderings.

In some embodiments, for a transmission of the ACK information and the SR information, the transmission of the ACK information and the SR information corresponds to a third cyclic shift group which is obtained from the first cyclic shift group, such that the first cyclic shift group and the third cyclic shift group have the same cyclic shift members but different cyclic shift member orderings. In some embodiments, for a transmission of the NACK information and the SR information, the transmission of the NACK information and the SR information corresponds to a fourth cyclic shift group which is obtained from the second cyclic shift group, such that the second cyclic shift group and the fourth cyclic shift group have the same cyclic shift members but different cyclic shift member orderings.

In some embodiments, if the UE transmits 1-bit hybrid automatic repeat request acknowledgement (HARQ-ACK) value 0 or 1-bit HARQ-ACK value 0 and a negative SR information, the UE determines a first cyclic shift group, where a first cyclic shift member of a first cyclic shift group has value 0. In some embodiments, if the UE transmits 1-bit HARQ-ACK value 1 or 1-bit HARQ-ACK value 1 and a negative SR information, the UE determines a second cyclic shift group, where a first cyclic shift member of a second cyclic shift group has value 6. In some embodiments, if the UE transmits 2-bit HARQ-ACK value {0,0} or 2-bit HARQ-ACK value {0,0} and a negative SR information, the UE determines a third cyclic shift group, where a first cyclic shift member of a third cyclic shift group has value 0. In some embodiments, if the UE transmits 2-bit HARQ-ACK value {0,1} or 2-bit HARQ-ACK value {0,1} and a negative SR information, the UE determines a fourth cyclic shift group, where a first cyclic shift member of a fourth cyclic shift group has value 3. In some embodiments, if the UE transmits 2-bit HARQ-ACK value {1,1} or 2-bit HARQ ACK value {1,1} and a negative SR information, the UE determines a fifth cyclic shift group, where a first cyclic shift member of the fifth cyclic shift group has value 6. In some embodiments, if the UE transmits 2-bit HARQ-ACK value {1,0} or 2-bit HARQ ACK value {1,0} and a negative SR information, the UE determines a sixth cyclic shift group, where a first cyclic shift member of the sixth cyclic shift group has value 9.

In some embodiments, if the UE transmits 1-bit HARQ ACK value 0 and a positive SR information, the UE determines a seventh cyclic shift group, where a first cyclic shift member of the seventh cyclic shift group has value 0 or value 3. In some embodiments, if the UE transmits 1-bit HARQ ACK value 1 and a positive SR information, the UE determines an eighth cyclic shift group, where a first cyclic shift member of the eighth cyclic shift group has value 6 or value 9. In some embodiments, if the UE transmits 2-bit HARQ ACK value {0,0} and a positive SR information, the UE determines a ninth cyclic shift group, where a first cyclic shift member of the ninth cyclic shift group has value 0 or value. In some embodiments, if the UE transmits 2-bit HARQ ACK value {0,1} and a positive SR information, the UE determines a tenth cyclic shift group, where a first cyclic shift member of the tenth cyclic shift group has value 3 or value 4. In some embodiments, if the UE transmits 2-bit HARQ ACK value {1,1} and a positive SR information, the UE determines an eleventh cyclic shift group #11, where a first cyclic shift member of the eleventh cyclic shift group has value 6 or value 7. In some embodiments, if the UE transmits 2-bit HARQ ACK value {1,0} and a positive SR information, the UE determines a twelfth cyclic shift group, where a first cyclic shift member of the twelfth cyclic shift group has value 9 or value 10.

Some embodiments of the present disclosure provide how to design a PUCCH format 0 in an interlaced structure and how it carries ACK/NACK and SR information. Some embodiments of the present disclosure include at least parts of the following.

Determine a cyclic shift group for any pair of three items, i.e. ACK, NACK and SR, assume ACK corresponds to a first cyclic shift group, NACK corresponds to a second cyclic shift group, at least one of the following cases is covered. The first cyclic shift group and the second cyclic shift group have at least one different cyclic shift member in the group; or the first cyclic shift group and the second cyclic shift group have different cyclic shift member orderings; or the first cyclic shift group and the second cyclic shift group have the same cyclic shift members but with different cyclic shift member orderings; or for ACK+SR transmission, ACK+SR corresponds to a third cyclic shift group which is obtained from the first cyclic shift group, such that the first cyclic shift group and the third cyclic shift group have the same cyclic shift members but different cyclic shift member ordering; or for NACK+SR transmission, NACK+SR corresponds to a fourth cyclic shift group which is obtained from the second cyclic shift group, such that the second cyclic shift group and the fourth cyclic shift group have the same cyclic shift members but different cyclic shift member ordering.

Some embodiments of the present disclosure may include at least one of the following cases from UE perspective:

If a UE wants to transmit 1-bit HARQ-ACK value 0 or 1-bit HARQ ACK value 0+negative SR, the UE determines the cyclic shift group #1, where the first cyclic shift member of the cyclic shift group #1 has value 0. If a UE wants to transmit 1-bit HARQ-ACK value 1 or 1-bit HARQ ACK value 1+negative SR, the UE determines the cyclic shift group #2, where the first cyclic shift member of the cyclic shift group #2 has value 6. If a UE wants to transmit 2-bit HARQ-ACK value {0,0} or 2-bit HARQ ACK value {0,0}+negative SR, the UE determines the cyclic shift group #3, where the first cyclic shift member of the cyclic shift group #3 has value 0. If a UE wants to transmit 2-bit HARQ-ACK value {0,1} or 2-bit HARQ ACK value {0,1}+negative SR, the UE determines the cyclic shift group #4, where the first cyclic shift member of the cyclic shift group #4 has value 3. If a UE wants to transmit 2-bit HARQ-ACK value {1,1} or 2-bit HARQ ACK value {1,1}+negative SR, the UE determines the cyclic shift group #5, where the first cyclic shift member of the cyclic shift group #5 has value 6. If a UE wants to transmit 2-bit HARQ-ACK value {1,0} or 2-bit HARQ ACK value {1,0}+negative SR, the UE determines the cyclic shift group #6, where the first cyclic shift member of the cyclic shift group #6 has value 9. If a UE wants to transmit 1-bit HARQ ACK value 0+positive SR, the UE determines the cyclic shift group #7, where the first cyclic shift member of the cyclic shift group #7 has value 0 or value 3. If a UE wants to transmit 1-bit HARQ ACK value 1+positive SR, the UE determines the cyclic shift group #8, where the first cyclic shift member of the cyclic shift group #8 has value 6 or value 9. If a UE wants to transmit 2-bit HARQ ACK value {0,0}+positive SR, the UE determines the cyclic shift group #9, where the first cyclic shift member of the cyclic shift group #9 has value 0 or value 1. If a UE wants to transmit 2-bit HARQ ACK value {0,1}+positive SR, the UE determines the cyclic shift group #10, where the first cyclic shift member of the cyclic shift group #10 has value 3 or value 4. If a UE wants to transmit 2-bit HARQ ACK value {1,1}+positive SR, the UE determines the cyclic shift group #11, where the first cyclic shift member of the cyclic shift group #11 has value 6 or value 7. If a UE wants to transmit 2-bit HARQ ACK value {1,0}+positive SR, the UE determines the cyclic shift group #12, where the first cyclic shift member of the cyclic shift group #12 has value 9 or value 10.

In some embodiments, the generation process comprises at least parts of three steps: 1) determine a first cyclic shift member in a group; 2) determine a cyclic shift group; and/or 3) cyclic shift group sequence to interlace mapping.

Determine a first cyclic shift member $m_{cs}^0$ in a group:

Assume some embodiments have an initial sequence S(n), n=0, ..., 11, and some embodiments select a first cyclic shift member named $m_{cs}^0$=0, ..., 11. Note that the selection of $m_{cs}^0$=0, ..., 11 can be relevant to the ACK/NACK information.

Determine a cyclic shift group{$m_{cs}^i$}:

The cyclic shift group {$m_{cs}^i$} is extended from the first cyclic shift member $m_{cs}^0$ to $m_{cs}^i$ with i=1, ..., $N_{RB}^{interlace}$−1, where $N_{RB}^{interlace}$ stands for the total number of RB within 1 interlace. For ease of presentation, we assign each element in the sequence {$m_{cs}^i$} to index 0 to index $N_{RB}^{interlace}$−1 in turn, then mi can be used to represent the element of index i in the sequence, where a value range of i is [0, $N_{RB}^{interlace}$−1]. As can be seen, {$m_{cs}^i$} can be understood as a sequence comprising $N_{RB}^{interlace}$ elements starting from $m_{cs}^0$.

It can be understood that when $m_{cs}$ is extended to $m_{cs}^i$ sequence, the cyclic shift α becomes an α sequence correspondingly. Each element in the $m_{cs}^i$ sequence or a sequence corresponds to a PRB, that is, each of the PRBs has a separate cyclic shift. In this way, the cyclic shift of each of the PRBs is no longer the same, and high PAPR issue can be solved.

In some embodiments of the present disclosure, expansion of the sequence {$m_{cs}^i$} is uniform, that is, the elements in the sequence can be arranged at equal intervals, and the interval between adjacent elements is fixed. Here, the interval can be defined as T. Here we assume that {$m_{cs}^i$} is a function of $m_{cs}^0$, then $m_{cs}^i$=($m_{cs}^0$+iT).

In addition, because the calculation formula of the cyclic shift a can perform calculation of modulo 12, in some embodiments of the present application, $m_{cs}^i$ may also be modulo 12 first to simplify the amount of data. One example could be $m_{cs}^i$=($m_{cs}^0$+iT)mod 12, understandably, due to the nature of modulo calculation, regardless of whether the modulo 12 calculation is performed on $m_{cs}^i$, the final calculated a values are all the same and will not affect the final result.

In still some embodiments of the present disclosure, because the calculation of modulo 12 will eventually be performed, it is sufficient for T to be an integer less than 12. Further, it can be understood that due to the nature of modulo calculation, if T can be divisible by 12, some elements in the $m_{cs}^i$ sequence or the α sequence will have the same value. To ensure that the values of the elements in the $m_{cs}^i$ sequence or the α sequence are not the same, T can be an integer that is relatively prime to 12 to reduce PAPR. T can be an integer less than 12 that is relatively prime to 12, such as 5, 7, 11, and so on. Thus, the initial sequence is extended to a group of sequences with each being cyclic shifted by the cyclic shift value corresponding to the cyclic shift member, that is:

$$S_{cs}^i(n) = e^{\frac{j\pi}{6}\alpha(i)n} \cdot S(n),$$

n=0, ..., 11; i=0, ..., $N_{RB}^{interlace}$−1, where α(i) is i-th phase rotation that is a function of the i-th cyclic shift member $m_{cs}^i$. In the following we simply write it as $$S_{cs}^i(n) = e^{\frac{j\pi}{6}m_{cs}^i n} \cdot S(n).$$

Cyclic group sequence-to-interlace mapping:

In this step, some embodiments map the $N_{RB}^{interlace}$ sequences to $N_{RB}^{interlace}$ RBs of an interlace. In an interlace, each RB has 12 subcarriers, and each cyclic shifted spreading sequence has 12 elements. Thus, the mapping between the i-th cyclic shifted sequence to the m-th interlace RB can be performed as index mapping, such that:

$S_{RB_{m=f(i)}}(n)=S_{cs}^i(n)$, n=0, ..., 11; i=0, ..., $N_{RB}^{interlace}$−1, where m is a function of i.

In an example: for 1-bit ACK/NACK HARQ feedback in PUCCH format 0 without SR: In this case, some embodiments can pick two distinct $m_{cs}^0$ values from 0 to 11, representing ACK and NACK, respectively. These two values are preferred to be distributed uniformly from 0 to 11, but this is not an obligation. One example is $m_{cs}^0$=0 indicating ACK and $m_{cs}^0$=6 indicating NACK.

For SSG operation, any co-prime number with 12 can be selected, here some embodiments select T=1. Thus, the cyclic shifted sequence for i-th RB becomes $$S_{cs}^i(n) = e^{\frac{j\pi}{6}m_{cs}^i n} \cdot S(n),$$

n=0, ..., 11; i=0, ..., $N_{RB}^{interlace}$−1 with $m_{cs}^i$=($m_{cs}^0$+1) mod 12. Finally, the sequence-to-interlace mapping function can be $S_{RB_{m=f(i)}}(n)=S_{cs}^i(n)$, n=0, ..., 11; i=0, ..., $N_{RB}^{interlace}$−1, with m=i.

In an example: for 1-bit ACK/NACK HARQ feedback in PUCCH format 0 with SR:

In this case, some embodiments can pick two distinct $m_{cs}^0$ values from 0 to 11, representing ACK and NACK, respectively. These two values are preferred to be distributed uniformly from 0 to 11, but this is not an obligation. One example is $m_{cs}^0$=0 indicating ACK and $m_{cs}^0$=6 indicating NACK. For SSG operation, any co-prime number with 12 can be selected, here we select T=1. Thus, the cyclic shifted sequence for i-th RB becomes $$S_{cs}^i(n) = e^{\frac{j\pi}{6} m_{cs}^i n} \cdot S(n),$$

n=0, . . . , 11; i=0, . . . , $N_{RB}^{interlace}$–1 with $m_{cs}^i$=($m_{cs}^0$+1) mod 12. Finally, the sequence-to-interlace mapping function can be used to indicate whether the SR is positive or negative, by $S_{RB_{m=f(i)}}(n)=S_{cs}^i(n)$, n=0, . . . , 11; i=0, . . . , $N_{RB}^{interlace}$–1, with m=i, indicating SR is negative; and to indicate SR is positive, some embodiments have $$m = \left(i + \frac{N_{RB}^{interlace}}{2}\right) \mod N_{RB}^{interlace},$$

if $N_{RB}^{interlace}$ is an even number.

$$m = \left(i + \frac{N_{RB}^{interlace} + 1}{2}\right) \mod N_{RB}^{interlace},$$

if $N_{RB}^{interlace}$ is an odd number.

In an example: for 2-bit ACK/NACK HARQ feedback in PUCCH format 0 without SR:

In this case, some embodiments can pick four distinct $m_{cs}^0$ values from 0 to 11, representing ACK and NACK, respectively. These selected values are preferred to be distributed uniformly from 0 to 11, but this is not an obligation. One example is $m_{cs}^0$=0 indicating {ACK,ACK}, $m_{cs}^0$=3 indicating {ACK,NACK}, $m_{cs}^0$=6 indicating {NACK, ACK}, and $m_{cs}^0$=9 indicating {NACK,NACK}. For SSG operation, any co-prime number with 12 can be selected, here some embodiments select T=1. Thus, the cyclic shifted sequence for i-th RB becomes $$S_{cs}^i(n) = e^{\frac{j\pi}{6} m_{cs}^i n} \cdot S(n),$$

n=0, . . . , 11; i=0, . . . , $N_{RB}^{interlace}$–1 with $m_{cs}^i$=($m_{cs}^0$+1) mod 12. Finally, the sequence-to-interlace mapping function can be $S_{RB_{m=f(i)}}(n)=S_{cs}^i(n)$, n=0, . . . , 11; i=0, . . . , $N_{RB}^{interlace}$–1 with m=i.

In an example: for 2-bit ACK/NACK HARQ feedback in PUCCH format 0 with SR:

In this case, some embodiments can pick four distinct $m_{cs}^0$ values from 0 to 11, representing ACK and NACK, respectively. These selected values are preferred to be distributed uniformly from 0 to 11, but this is not an obligation. One example is $m_{cs}^0$=0 indicating {ACK,ACK}, $m_{cs}^0$=3 indicating {ACK,NACK}, $m_{cs}^0$=6 indicating {NACK, ACK}, and $m_{cs}^0$=9 indicating {NACK,NACK}. For SSG operation, any co-prime number with 12 can be selected, here we select T=1. Thus, the cyclic shifted sequence for i-th RB becomes $$S_{cs}^i(n) = e^{\frac{j\pi}{6} m_{cs}^i n} \cdot S(n),$$

n=0, . . . , 11; i=0, . . . , $N_{RB}^{interlace}$–1 with $m_{cs}^i$=($m_{cs}^0$+1) mod 12. Finally, the sequence-to-interlace mapping function can be used to indicate whether the SR is positive or negative, by $S_{RB_{m=f(i)}}(n)=S_{cs}^i(n)$, n=0, . . . , 11; i=0, . . . , $N_{RB}^{interlace}$–1, with m=i, indicating SR is negative: and to indicate SR is positive, some embodiments have $$m = \left(i + \frac{N_{RB}^{interlace}}{2}\right) \mod N_{RB}^{interlace},$$

if $N_{RB}^{interlace}$ is an even number.

$$m = \left(i + \frac{N_{RB}^{interlace} + 1}{2}\right) \mod N_{RB}^{interlace},$$

if $N_{RB}^{interlace}$ is an odd number.

In an example: Take 10 PRBs of one interlace used for PUCCH transmission as example. If a UE would transmit positive SR (or negative SR) and at most two HARQ-ACK information bits in a PUCCH resource, the UE determines a cyclic shift group where the cyclic shift group is determined from the value of one HARQ-ACK information bit or from the values of two HARQ-ACK information bits. The cyclic shift group can be one cyclic shift group of Table 1.

For this example, some cases are listed below to explain the implementation of this example in more detail. Each case provides 4 specific $m_{cs}$ sequences according to values of SR and HARQ-ACK information. It is easy to see that these sequences can be obtained according to the functions mentioned above. For example, a value of an interval of adjacent elements in the sequence can be understood as the T value in the formula, and the T values of the four sequences in each case are 1, 5, 7, and 11 respectively. For another example, the value of the first element in the sequence can be understood as $m_{cs}^0$ in the function, and the format of the elements in the sequence can be understood as the number of RBs, $N_{RB}^{interlace}$.

Case 1: the cyclic shift group corresponding to negative SR+1 bit HARQ-ACK value 0 can be one of the following cyclic shift groups: {0, 1, 2, 3, 4, 5, 6, 7, 8, 9}; {0, 5, 10, 3, 8, 1, 6, 11, 4, 9}; {0, 7, 2, 9, 4, 11, 6, 1, 8, 3}; {0, 11, 10, 9, 8, 7, 6, 5, 4, 3}.

Case 2: the cyclic shift group corresponding to negative SR+1 bit HARQ-ACK value 1 can be one of the following cyclic shift groups: {6, 7, 8, 9, 10, 11, 0, 1, 2, 3}; {6, 11, 4, 9, 2, 7, 0, 5, 10, 3}; {6, 1, 8, 3, 10, 5, 0, 7, 2, 9}; {6, 5, 4, 3, 2, 1, 0, 11, 10, 9}.

Case 3: the cyclic shift group corresponding to negative SR+2 bit HARQ-ACK value {0,0} can be one of the following cyclic shift groups: {0, 1, 2, 3, 4, 5, 6, 7, 8, 9}; {0, 5, 10, 3, 8, 1, 6, 11, 4, 9}; {0, 7, 2, 9, 4, 11, 6, 1, 8, 3}; {0, 11, 10, 9, 8, 7, 6, 5, 4, 3}.

Case 4: the cyclic shift group corresponding to negative SR+2 bit HARQ-ACK value {0,1} can be one of the following cyclic shift groups: {3, 4, 5, 6, 7, 8, 9, 10, 11, 0}; {3, 8, 1, 6, 11, 4, 9, 2, 7, 0}; {3, 10, 5, 0, 7, 2, 9, 4, 11, 6}; {3, 2, 1, 0, 11, 10, 9, 8, 7, 6}.

Case 5: the cyclic shift group corresponding to negative SR+2 bit HARQ-ACK value {1,1} can be one of the following cyclic shift groups: {6, 7, 8, 9, 10, 11, 0, 1, 2, 3}; {6, 11, 4, 9, 2, 7, 0, 5, 10, 3}; {6, 1, 8, 3, 10, 5, 0, 7, 2, 9}; {6, 5, 4, 3, 2, 1, 0, 11, 10, 9}.

Case 6: the cyclic shift group corresponding to negative SR+2 bit HARQ-ACK value {1,0} can be one of the following cyclic shift groups: {9, 10, 11, 0, 1, 2, 3, 4, 5, 6}; {9, 2, 7, 0, 5, 10, 3, 8, 1, 6}; {9, 4, 11, 6, 1, 8, 3, 10, 5, 0}; {9, 8, 7, 6, 5, 4, 3, 2, 1, 0}.

Case 7: the cyclic shift group corresponding to positive SR+1 bit HARQ-ACK value 0 can be one of the following cyclic shift groups: {3, 4, 5, 6, 7, 8, 9, 10, 11, 0}; {3, 8, 1, 6, 11, 4, 9, 2, 7, 0}; {3, 10, 5, 0, 7, 2, 9, 4, 11, 6}; {3, 2, 1, 0, 11, 10, 9, 8, 7, 6}.

Case 8: the cyclic shift group corresponding to positive SR+1 bit HARQ-ACK value 1 can be one of the following cyclic shift groups: {9, 10, 11, 0, 1, 2, 3, 4, 5, 6}; {9, 2, 7, 0, 5, 10, 3, 8, 1, 6}; {9, 4, 11, 6, 1, 8, 3, 10, 5, 0}; {9, 8, 7, 6, 5, 4, 3, 2, 1, 0}.

Case 9: the cyclic shift group corresponding to positive SR+2 bit HARQ-ACK value {0,0} can be one of the following cyclic shift groups: {1, 2, 3, 4, 5, 6, 7, 8, 9, 10}; {1, 6, 11, 4, 9, 2, 7, 0, 5, 10}; {1, 8, 3, 10, 5, 0, 7, 2, 9, 4}; {1, 0, 11, 10, 9, 8, 7, 6, 5, 4}.

Case 10: the cyclic shift group corresponding to positive SR+2 bit HARQ-ACK value {0,1} can be one of the following cyclic shift groups: {4, 5, 6, 7, 8, 9, 10, 11, 0, 1}; {4, 9, 2, 7, 0, 5, 10, 3, 8, 1}; {4, 11, 6, 1, 8, 3, 10, 5, 0, 7}; {4, 3, 2, 1, 0, 11, 10, 9, 8, 7}.

Case 11: the cyclic shift group corresponding to positive SR+2 bit HARQ-ACK value {1, 1} can be one of the following cyclic shift groups: {7, 8, 9, 10, 11, 0, 1, 2, 3, 4}; {7, 0, 5, 10, 3, 8, 1, 6, 11, 4}; {7, 2, 9, 4, 11, 6, 1, 8, 3, 10}; {7, 6, 5, 4, 3, 2, 1, 0, 11, 10}.

Case 12: the cyclic shift group corresponding to positive SR+2 bit HARQ-ACK value {1, 0} can be one of the following cyclic shift groups: {10, 11, 0, 1, 2, 3, 4, 5, 6, 7}; {10, 3, 8, 1, 6, 11, 4, 9, 2, 7}; {10, 5, 0, 7, 2, 9, 4, 11, 6, 1}; {10, 9, 8, 7, 6, 5, 4, 3, 2, 1}.

In the cases 1 to 12 provided above in the above example, the interval T is a fixed value. T values of the four sequences in each case are 1, 5, 7, and 11 respectively. However, different SR types and HARQ-ACK values correspond to different $m_{cs}^0$. The following will take T=5 (that is, the second sequence in each case) as an example to compare the differences of $m_{cs}^0$ (that is, the first element in the sequence) between the above cases.

For example, by comparing the second sequence in the case 1 and the case 2 in the above example, it can be concluded that when the type of SR is a negative SR and the length of HARQ-ACK is 1 bit, HARQ-ACK value and $m_{cs}^0$ value have the following correspondence relationship:

| | HARQ-ACK value | |
|---|---|---|
| | 0 | 1 |
| $m_{cs}^0$ value | 0 | 6 |

For another example, by comparing the second sequence in the case 3 to the case 6 in the above example, it can be concluded that when the type of SR is a negative SR and the length of HARQ-ACK is 2 bits, the HARQ-ACK value and $m_{cs}^0$ value have the following correspondence relationship:

| | HARQ-ACK Value | | | |
|---|---|---|---|---|
| | {0, 0} | {0, 1} | {1, 1} | {1, 0} |
| $m_{cs}^0$ value | 0 | 3 | 6 | 9 |

For another example, by comparing the second sequence in the case 7 and the case 8 in the above example, it can be concluded that when the type of SR is a positive SR and the length of HARQ-ACK is 1 bit, the HARQ-ACK value and $m_{cs}^0$ value have the following corresponding relationship:

| | HARQ-ACK Value | |
|---|---|---|
| | 0 | 1 |
| $m_{cs}^0$ value | 3 | 9 |

For another example, by comparing the second sequence in the case 9 to the case 12 in the above example, it can be concluded that when the type of SR is a positive SR and the length of HARQ-ACK is 2 bits, the HARQ-ACK value and $m_{cs}^0$ value have the following corresponding relationship:

| | HARQ-ACK Value | | | |
|---|---|---|---|---|
| | {0, 0} | {0, 1} | {1, 1} | {1, 0} |
| $m_{cs}^0$ value | 1 | 4 | 7 | 10 |

In some embodiments, a table 1 includes cyclic shift groups is illustrated in the following. In the table 1, the row header is used to indicate each cyclic shift group, that is, each $m_{cs}^i$ sequence, and the column header is used to indicate that each element in the $m_{cs}^i$ sequence corresponds to an RB in an interlace in turn.

TABLE 1

| index | RB 0 | RB 1 | RB 2 | RB 3 | RB 4 | RB 5 | RB 6 | RB 7 | RB 8 | RB 9 |
|---|---|---|---|---|---|---|---|---|---|---|
| 0 | 0 | 1 | 2 | 3 | 4 | 5 | 6 | 7 | 8 | 9 |
| 1 | 1 | 2 | 3 | 4 | 5 | 6 | 7 | 8 | 9 | 10 |
| 2 | 2 | 3 | 4 | 5 | 6 | 7 | 8 | 9 | 10 | 11 |
| 3 | 3 | 4 | 5 | 6 | 7 | 8 | 9 | 10 | 11 | 0 |
| 4 | 4 | 5 | 6 | 7 | 8 | 9 | 10 | 11 | 0 | 1 |
| 5 | 5 | 6 | 7 | 8 | 9 | 10 | 11 | 0 | 1 | 2 |
| 6 | 6 | 7 | 8 | 9 | 10 | 11 | 0 | 1 | 2 | 3 |
| 7 | 7 | 8 | 9 | 10 | 11 | 0 | 1 | 2 | 3 | 4 |
| 8 | 8 | 9 | 10 | 11 | 0 | 1 | 2 | 3 | 4 | 5 |
| 9 | 9 | 10 | 11 | 0 | 1 | 2 | 3 | 4 | 5 | 6 |
| 10 | 10 | 11 | 0 | 1 | 2 | 3 | 4 | 5 | 6 | 7 |
| 11 | 11 | 0 | 1 | 2 | 3 | 4 | 5 | 6 | 7 | 8 |
| 12 | 0 | 5 | 10 | 3 | 8 | 1 | 6 | 11 | 4 | 9 |
| 13 | 1 | 6 | 11 | 4 | 9 | 2 | 7 | 0 | 5 | 10 |
| 14 | 2 | 7 | 0 | 5 | 10 | 3 | 8 | 1 | 6 | 11 |
| 15 | 3 | 8 | 1 | 6 | 11 | 4 | 9 | 2 | 7 | 0 |
| 16 | 4 | 9 | 2 | 7 | 0 | 5 | 10 | 3 | 8 | 1 |
| 17 | 5 | 10 | 3 | 8 | 1 | 6 | 11 | 4 | 9 | 2 |
| 18 | 6 | 11 | 4 | 9 | 2 | 7 | 0 | 5 | 10 | 3 |
| 19 | 7 | 0 | 5 | 10 | 3 | 8 | 1 | 6 | 11 | 4 |
| 20 | 8 | 1 | 6 | 11 | 4 | 9 | 2 | 7 | 0 | 5 |
| 21 | 9 | 2 | 7 | 0 | 5 | 10 | 3 | 8 | 1 | 6 |
| 22 | 10 | 3 | 8 | 1 | 6 | 11 | 4 | 9 | 2 | 7 |
| 23 | 11 | 4 | 9 | 2 | 7 | 0 | 5 | 10 | 3 | 8 |
| 24 | 0 | 7 | 2 | 9 | 4 | 11 | 6 | 1 | 8 | 3 |
| 25 | 1 | 8 | 3 | 10 | 5 | 0 | 7 | 2 | 9 | 4 |
| 26 | 2 | 9 | 4 | 11 | 6 | 1 | 8 | 3 | 10 | 5 |
| 27 | 3 | 10 | 5 | 0 | 7 | 2 | 9 | 4 | 11 | 6 |
| 28 | 4 | 11 | 6 | 1 | 8 | 3 | 10 | 5 | 0 | 7 |
| 29 | 5 | 0 | 7 | 2 | 9 | 4 | 11 | 6 | 1 | 8 |
| 30 | 6 | 1 | 8 | 3 | 10 | 5 | 0 | 7 | 2 | 9 |
| 31 | 7 | 2 | 9 | 4 | 11 | 6 | 1 | 8 | 3 | 10 |
| 32 | 8 | 3 | 10 | 5 | 0 | 7 | 2 | 9 | 4 | 11 |
| 33 | 9 | 4 | 11 | 6 | 1 | 8 | 3 | 10 | 5 | 0 |
| 34 | 10 | 5 | 0 | 7 | 2 | 9 | 4 | 11 | 6 | 1 |
| 35 | 11 | 6 | 1 | 8 | 3 | 10 | 5 | 0 | 7 | 2 |
| 36 | 0 | 11 | 10 | 9 | 8 | 7 | 6 | 5 | 4 | 3 |
| 37 | 1 | 0 | 11 | 10 | 9 | 8 | 7 | 6 | 5 | 4 |
| 38 | 2 | 1 | 0 | 11 | 10 | 9 | 8 | 7 | 6 | 5 |
| 39 | 3 | 2 | 1 | 0 | 11 | 10 | 9 | 8 | 7 | 6 |
| 40 | 4 | 3 | 2 | 1 | 0 | 11 | 10 | 9 | 8 | 7 |
| 41 | 5 | 4 | 3 | 2 | 1 | 0 | 11 | 10 | 9 | 8 |
| 42 | 6 | 5 | 4 | 3 | 2 | 1 | 0 | 11 | 10 | 9 |
| 43 | 7 | 6 | 5 | 4 | 3 | 2 | 1 | 0 | 11 | 10 |
| 44 | 8 | 7 | 6 | 5 | 4 | 3 | 2 | 1 | 0 | 11 |

TABLE 1-continued

| index | RB 0 | RB 1 | RB 2 | RB 3 | RB 4 | RB 5 | RB 6 | RB 7 | RB 8 | RB 9 |
|---|---|---|---|---|---|---|---|---|---|---|
| 45 | 9 | 8 | 7 | 6 | 5 | 4 | 3 | 2 | 1 | 0 |
| 46 | 10 | 9 | 8 | 7 | 6 | 5 | 4 | 3 | 2 | 1 |
| 47 | 11 | 10 | 9 | 8 | 7 | 6 | 5 | 4 | 3 | 2 |

In an example:

Some embodiments also take 10 PRBs of one interlace used for PUCCH transmission as an example. If a UE would transmit negative SR and at most two HARQ-ACK information bits in a PUCCH resource, the UE determines a cyclic shift group e.g., cyclic shift group #0 where the cyclic shift group #0 is determined from the value of one HARQ-ACK information bit or from the values of two HARQ-ACK information bits. The cyclic shift group #0 can be one cyclic shift group of Table 1. If a UE would transmit positive SR and at most two HARQ-ACK information bits in a PUCCH resource, the UE determines a cyclic shift group e.g., cyclic shift group #1 where the cyclic shift group #1 is determined from the cyclic shift group #0, for example, the cyclic shift group #0 and the cyclic shift group #1 have the same cyclic shift members but different cyclic shift member ordering. Note that UE may also determine cyclic shift group #1 first, and then determine cyclic shift group #0 based on cyclic shift group #1 follow similar rules described above.

Some embodiments of the present disclosure in the above example may include at least one of the following cases:

Case 1: the cyclic shift group corresponding to negative SR+1 bit HARQ-ACK value 0 can be one of the following cyclic shift groups: {0, 1, 2, 3, 4, 5, 6, 7, 8, 9}; {0, 5, 10, 3, 8, 1, 6, 11, 4, 9}; {0, 7, 2, 9, 4, 11, 6, 1, 8, 3}; {0, 11, 10, 9, 8, 7, 6, 5, 4, 3}.

Case 2: the cyclic shift group corresponding to negative SR+1 bit HARQ-ACK value 1 can be one of the following cyclic shift groups: {6, 7, 8, 9, 10, 11, 0, 1, 2, 3}; {6, 11, 4, 9, 2, 7, 0, 5, 10, 3}; {6, 1, 8, 3, 10, 5, 0, 7, 2, 9}; {6, 5, 4, 3, 2, 1, 0, 11, 10, 9}.

Case 3: the cyclic shift group corresponding to negative SR+2 bit HARQ-ACK value {0,0} can be one of the following cyclic shift groups: {0, 1, 2, 3, 4, 5, 6, 7, 8, 9}; {0, 5, 10, 3, 8, 1, 6, 11, 4, 9}; {0, 7, 2, 9, 4, 11, 6, 1, 8, 3}; {0, 11, 10, 9, 8, 7, 6, 5, 4, 3}.

Case 4: the cyclic shift group corresponding to negative SR+2 bit HARQ-ACK value {0,1} can be one of the following cyclic shift groups: {3, 4, 5, 6, 7, 8, 9, 10, 11, 0}; {3, 8, 1, 6, 11, 4, 9, 2, 7, 0}; {3, 10, 5, 0, 7, 2, 9, 4, 11, 6}; {3, 2, 1, 0, 11, 10, 9, 8, 7, 6}.

Case 5: the cyclic shift group corresponding to negative SR+2 bit HARQ-ACK value {1,1} can be one of the following cyclic shift groups: {6, 7, 8, 9, 10, 11, 0, 1, 2, 3}; {6, 11, 4, 9, 2, 7, 0, 5, 10, 3}; {6, 1, 8, 3, 10, 5, 0, 7, 2, 9}; {6, 5, 4, 3, 2, 1, 0, 11, 10, 9}.

Case 6: the cyclic shift group corresponding to negative SR+2 bit HARQ-ACK value {1,0} can be one of the following cyclic shift groups: {9, 10, 11, 0, 1, 2, 3, 4, 5, 6}; {9, 2, 7, 0, 5, 10, 3, 8, 1, 6}; {9, 4, 11, 6, 1, 8, 3, 10, 5, 0}; {9, 8, 7, 6, 5, 4, 3, 2, 1, 0}.

Case 7: the cyclic shift group corresponding to positive SR+1 bit HARQ-ACK value 0 can be one of the following cyclic shift groups: {5, 6, 7, 8, 9, 0, 1, 2, 3, 4,}; {1, 6, 11, 4, 9, 0, 5, 10, 3, 8}; {11, 6, 1, 8, 3, 0, 7, 2, 9, 4}; {7, 6, 5, 4, 3, 0, 11, 10, 9, 8}.

Case 8: the cyclic shift group corresponding to positive SR+1 bit HARQ-ACK value 1 can be one of the following cyclic shift groups: {11, 0, 1, 2, 3, 6, 7, 8, 9, 10}; {7, 0, 5, 10, 3, 6, 11, 4, 9, 2}; {5, 0, 7, 2, 9, 6, 1, 8, 3, 10}; {1, 0, 11, 10, 9, 6, 5, 4, 3, 2}.

Case 9: the cyclic shift group corresponding to positive SR+2 bit HARQ-ACK value {0,0} can be one of the following cyclic shift groups: {5, 6, 7, 8, 9, 0, 1, 2, 3, 4}; {1, 6, 11, 4, 9, 0, 5, 10, 3, 8}; {11, 6, 1, 8, 3, 0, 7, 2, 9, 4}; {7, 6, 5, 4, 3, 0, 11, 10, 9, 8}.

Case 10: the cyclic shift group corresponding to positive SR+2 bit HARQ-ACK value {0,1} can be one of the following cyclic shift groups: {8, 9, 10, 11, 0, 3, 4, 5, 6, 7}; {4, 9, 2, 7, 0, 3, 8, 1, 6, 11}; {2, 9, 4, 11, 6, 3, 10, 5, 0, 7}; {10, 9, 8, 7, 6, 3, 2, 1, 0, 11}.

Case 11: the cyclic shift group corresponding to positive SR+2 bit HARQ-ACK value {1,1} can be one of the following cyclic shift groups: {11, 0, 1, 2, 3, 6, 7, 8, 9, 10}; {7, 0, 5, 10, 3, 6, 11, 4, 9, 2}; {5, 0, 7, 2, 9, 6, 1, 8, 3, 10}; {1, 0, 11, 10, 9, 6, 5, 4, 3, 2}.

Case 12: the cyclic shift group corresponding to positive SR+2 bit HARQ-ACK value {1,0} can be one of the following cyclic shift groups: {2, 3, 4, 5, 6, 9, 10, 11, 0, 1}; {10, 3, 8, 1, 6, 9, 2, 7, 0, 5}; {8, 3, 10, 5, 0, 9, 4, 11, 6, 1}; {4, 3, 2, 1, 0, 9, 8, 7, 6, 5}.

In summary, some embodiments of the present provide a method of generating PUCCH format 0 in an interlaced structure that can carrier 1-bit ACK/NACK, 2-bit ACK/NACK, and a signaling request. Moreover, this method allows to maintain a low PAPR property.

Commercial interests for some embodiments are as follows. 1. Solving issues in the prior art. 2. Providing a generation process of an interlaced control channel. 3. Maintaining a low peak-to-average power ratio (PAPR) property. 4. Providing a good communication performance. 5. Providing a high reliability. 6. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 6:
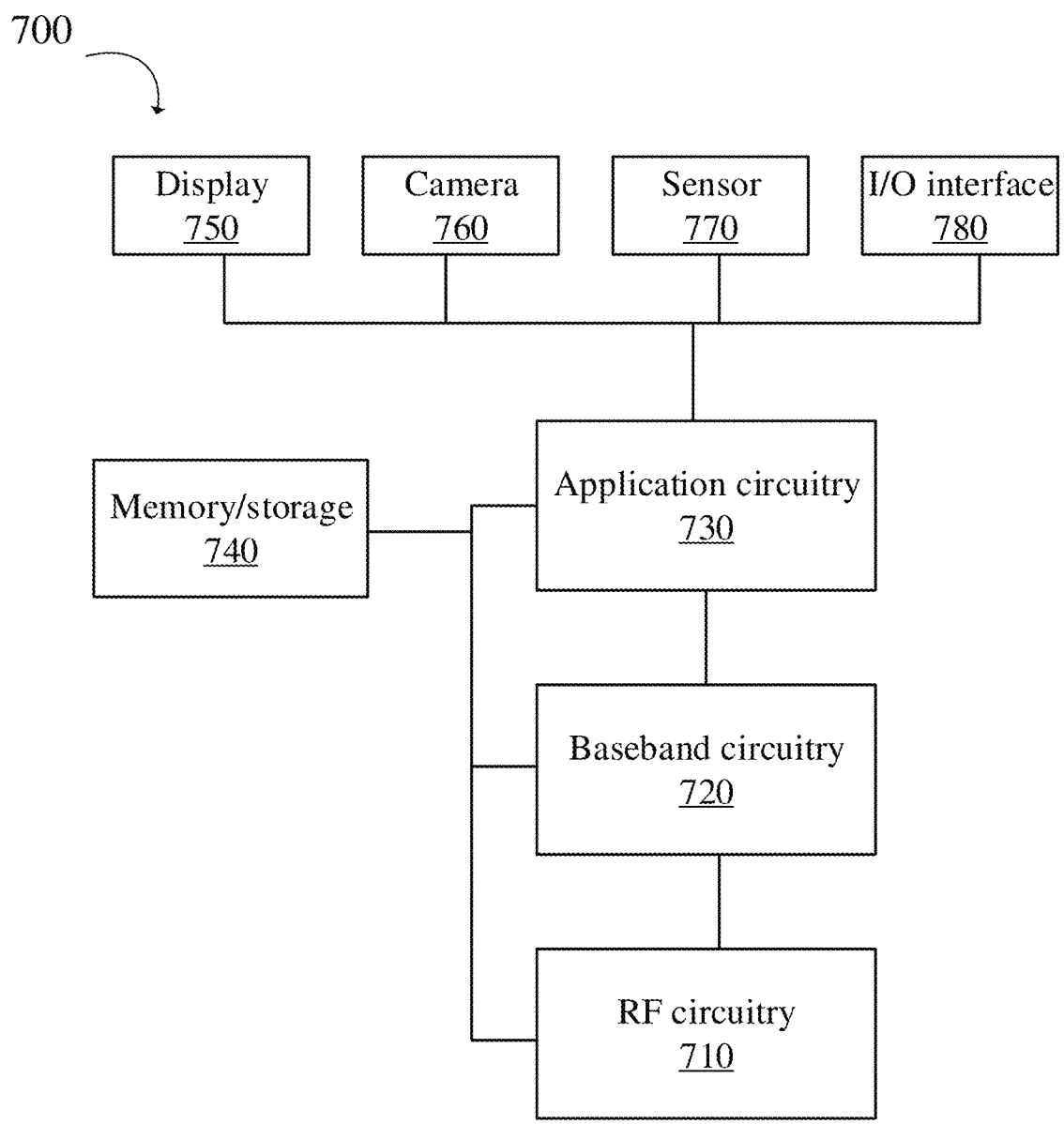
FIG. 6 is a block diagram of a system for wireless communication according to an embodiment of the present disclosure.

FIG. 6 is a block diagram of an example system 700 for wireless communication according to an embodiment of the present disclosure. Embodiments described herein may be implemented into the system using any suitably configured hardware and/or software. FIG. 6 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental states and/or location first information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the state of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. An information processing method, comprising:
   determining, by a user equipment, a cyclic shift sequence comprising N cyclic shifts according to a hybrid automatic repeat request acknowledgement (HARQ-ACK) information to be transmitted and/or a scheduling request (SR) to be transmitted, wherein a resource in a frequency domain used for transmitting the HARQ-ACK information to be transmitted and/or the SR to be transmitted is a target interlace, the target interlace comprises N physical resource blocks (PRBs), the N cyclic shifts have a one-to-one correspondence with the N PRBs, and N is an integer and greater than 1;
   generating, by the user equipment, a target physical uplink control channel (PUCCH) based on PUCCH format_0 according to the cyclic shift sequence; and
   transmitting, by the user equipment, the target PUCCH on the target interlace;
   wherein the cyclic shift sequence is obtained from $m_{cs}$ parameter sequence, the $m_{cs}$ parameter sequence comprises N $m_{cs}$ parameters, and the N cyclic shifts have a one-to-one correspondence with the N $m_{cs}$ parameters.

2. The method according to claim 1, wherein the N cyclic shifts are in sequence from $\alpha_0$ to $\alpha_{N-1}$, and the N PRBs are in sequence from $PRB_0$ to $PRB_{N-1}$; and
   the one-to-one correspondence between the N cyclic shifts and the N PRBs comprises: $\alpha_i$ in the cyclic shift sequence corresponds to $PRB_i$ in the N PRBs, and a value range of i is [0, N−1].

3. The method according to claim 1, wherein the N $m_{cs}$ parameters are in sequence from $m_{cs}^0$, to $m_{cs}^{N-1}$, the one-to-one correspondence between the N cyclic shifts and the N $m_{cs}$ parameters comprises:
   $\alpha_i$ in the cyclic shift sequence corresponds to $m_{cs}^i$ in the $m_{cs}$ parameter sequence, and a value range of i is [0, N−1].

4. The method according to claim 1, wherein:
   the SR comprises one of the followings: a negative SR or a positive SR.

5. The method according to claim 1, wherein:
   a starting element of the $m_{cs}$ parameter sequence is $m_{cs}^0$, and a value of $m_{cs}^0$, is associated with the HARQ-ACK information and/or the SR.

6. The method according to claim 1, wherein:
   adjacent elements in the $m_{cs}$ parameter sequence are set at equal intervals, a value of the interval is T, and T is an integer relatively prime to 12.

7. The method according to claim 6, wherein T is equal to 5, $m_{cs}^i = (m_{cs}^0 + iT) \mod 12$, and N is equal to 10 or 11.

8. An information processing method, comprising:
   parsing, by a base station, a target physical uplink control channel (PUCCH) on a target interlace based on PUCCH format_0 according to a cyclic shift sequence comprising N cyclic shifts;
   obtaining, by the base station, modulation and coding scheme (MCS)-0 by parsing the cyclic shift sequence; and
   obtaining, by the base station, a hybrid automatic repeat request acknowledgement (HARQ-ACK) information and/or a scheduling request (SR) on the PUCCH, wherein a resource in a frequency domain used for transmitting the HARQ-ACK information and/or the SR is the target interlace, the target interlace comprises N physical resource blocks (PRBs), the N cyclic shifts have a one-to-one correspondence with the N PRBs, and N is an integer and greater than 1.

9. The method according to claim 8, wherein the N cyclic shifts are in sequence from $\alpha_0$ to $\alpha_{N-1}$, and the N PRBs are in sequence from $PRB_0$ to $PRB_{N-1}$; and
   the one-to-one correspondence between the N cyclic shifts and the N PRBs comprises: $\alpha_i$ in the cyclic shift sequence corresponds to $PRB_i$ in the N PRBs, and a value range of i is [0, N−1].

10. The method according to claim 8, wherein the cyclic shift sequence is obtained from $m_{cs}$ parameter sequence, the $m_{cs}$ parameter sequence comprises N $m_{cs}$ parameters, and the N cyclic shifts have a one-to-one correspondence with the N $m_{cs}$ parameters.

11. The method according to claim 10, wherein the N $m_{cs}$ parameters are in sequence from $m_{cs}^0$, to $m_{cs}^{N-1}$, the one-to-one correspondence between the N cyclic shifts and the N $m_{cs}$ parameters comprises:
    $\alpha_i$ in the cyclic shift sequence corresponds to $m_{cs}^i$ in the $m_{cs}$ parameter sequence, and a value range of i is [0, N−1].

12. The method according to claim 8, wherein:
    the SR comprises one of the followings: a negative SR or a positive SR.

13. The method according to claim 10, wherein:
    a starting element of the $m_{cs}$ parameter sequence is $m_{cs}^0$, and a value of $m_{cs}^0$, is associated with the HARQ-ACK information and/or the SR.

14. The method according to claim 10, wherein:
    adjacent elements in the $m_{cs}$ parameter sequence are set at equal intervals, a value of the interval is T, and T is an integer relatively prime to 12.

15. The method according to claim 14, wherein T is equal to 5, $m_{cd}^i = (m_{cs}^0 + iT) \mod 12$, and N is equal to 10 or 11.

16. A user equipment, comprising:
    a memory;
    a transceiver; and
    a processor coupled to the memory and the transceiver;
    wherein the processor is configured to determine a cyclic shift sequence comprising N cyclic shifts according to a hybrid automatic repeat request acknowledgement (HARQ-ACK) information to be transmitted and/or a scheduling request (SR) to be transmitted, wherein a resource in a frequency domain used for transmitting the HARQ-ACK information to be transmitted and/or the SR to be transmitted is a target interlace, the target interlace comprises N physical resource blocks (PRBs), the N cyclic shifts have a one-to-one correspondence with the N PRBs, and N is an integer and greater than 1;

wherein the processor is configured to generate a target physical uplink control channel (PUCCH) based on PUCCH format_0 according to the cyclic shift sequence;

wherein the transceiver is configured to transmit the target PUCCH on the target interlace; and wherein the cyclic shift sequence is obtained from $m_{cs}$ parameter sequence, the $m_{cs}$ parameter sequence comprises N $m_{cs}$ parameters, and the N cyclic shifts have a one-to-one correspondence with the N $m_{cs}$ parameters.

17. The user equipment according claim 16, wherein: a starting element of the $m_{cs}$ parameter sequence is $m_{cs}^0$, and a value of $m_{cs}^0$, is associated with the HARQ-ACK information and/or the SR.

18. The user equipment according to claim 17, wherein: when the HARQ-ACK information has a length of 1 bit and a value of 0, or when the SR is a negative SR and the HARQ-ACK information has a length of 1 bit and a value of 0, the value of $m_{cs}^0$ is 0; and when the HARQ-ACK information has a length of 1 bit and a value of 1, or when the SR is the negative SR and the HARQ-ACK information has a length of 1 bit and a value of 1, the value of $m_{cs}^0$ is 6, or wherein:

when the HARQ-ACK information has a length of 2 bits and a value of {0, 0}, or when the SR is a negative SR and the HARQ-ACK information has a length of 2 bits and a value of {0, 0}, the value of $m_{cs}^0$ is 0;

when the HARQ-ACK information has a length of 2 bits and a value of {0, 1}, or when the SR is the negative SR and the HARQ-ACK information has a length of 2 bits and a value of {0, 1}, the value of $m_{cs}^0$ is 3;

when the HARQ-ACK information has a length of 2 bits and a value of {1, 1}, or when the SR is the negative SR and the HARQ-ACK information has a length of 2 bits and a value of {1, 1}, the value of $m_{cs}^0$ is 6; and when the HARQ-ACK information has a length of 2 bits and a value of {1, 0}, or when the SR is the negative SR and the HARQ-ACK information has a length of 2 bits and a value of {1, 0}, the value of $m_{cs}^0$ is 9.

19. The user equipment according to claim 17, wherein: when the SR is a positive SR, and the HARQ-ACK information has a length of 1 bit and a value of 0, the value of $m_{cs}^0$ is 3; and when the SR is the positive SR, and the HARQ-ACK information has a length of 1 bit and a value of 1, the value of $m_{cs}^0$ is 9, or wherein:

when the SR is a positive SR, and the HARQ-ACK information has a length of 2 bits and a value of {0, 0}, the value of $m_{cs}^0$ is 1;

when the SR is the positive SR, and the HARQ-ACK information has a length of 2 bits and a value of {0, 1}, the value of $m_{cs}^0$ is 4;

when the SR is the positive SR, and the HARQ-ACK information has a length of 2 bits and a value of {1, 1}, the value of $m_{cs}^0$ is 7; and when the SR is the positive SR, and the HARQ-ACK information has a length of 2 bits and a value of {1, 0}, the value of $m_{cs}^0$ is 10.

20. A base station, comprising:
a memory;
a transceiver; and
a processor coupled to the memory and the transceiver;
wherein the processor is configured to:

parse a target physical uplink control channel (PUCCH) on a target interlace based on PUCCH format_0 according to a cyclic shift sequence comprising N cyclic shifts;

obtain modulation and coding scheme (MCS)-0 by parsing the cyclic shift sequence; and obtain a hybrid automatic repeat request acknowledgement (HARQ-ACK) information and/or a scheduling request (SR) on the PUCCH, wherein a resource in a frequency domain used for transmitting the HARQ-ACK information and/or the SR is the target interlace, the target interlace comprises N physical resource blocks (PRBs), the N cyclic shifts have a one-to-one correspondence with the N PRBs, and N is an integer and greater than 1.

21. The base station according to claim 20, wherein the cyclic shift sequence is obtained from $m_{cs}$ parameter sequence, the $m_{cs}$ parameter sequence comprises N $m_{cs}$ parameters, and the N cyclic shifts have a one-to-one correspondence with the N $m_{cs}$ parameters.

22. The base station according to claim 21, wherein: a starting element of the $m_{cs}$ parameter sequence is $m_{cs}^0$, and a value of $m_{cs}^0$ is associated with the HARQ-ACK information and/or the SR.

23. The base station according to claim 22, wherein: when the HARQ-ACK information has a length of 1 bit and a value of 0, or when the SR is a negative SR and the HARQ-ACK information has a length of 1 bit and a value of 0, the value of $m_{cs}^0$ is 0; and when the HARQ-ACK information has a length of 1 bit and a value of 1, or when the SR is the negative SR and the HARQ-ACK information has a length of 1 bit and a value of 1, the value of $m_{cs}^0$ is 6, or wherein:

when the HARQ-ACK information has a length of 2 bits and a value of {0, 0}, or when the SR is a negative SR and the HARQ-ACK information has a length of 2 bits and a value of {0, 0}, the value of $m_{cs}^0$ is 0;

when the HARQ-ACK information has a length of 2 bits and a value of {0, 1}, or when the SR is the negative SR and the HARQ-ACK information has a length of 2 bits and a value of {0, 1}, the value of $m_{cs}^0$ is 3;

when the HARQ-ACK information has a length of 2 bits and a value of {1, 1}, or when the SR is the negative SR and the HARQ-ACK information has a length of 2 bits and a value of {1, 1}, the value of $m_{cs}^0$ is 6; and when the HARQ-ACK information has a length of 2 bits and a value of {1, 0}, or when the SR is the negative SR and the HARQ-ACK information has a length of 2 bits and a value of {1, 0}, the value of $m_{cs}^0$ is 9.

24. The base station according to claim 22, wherein: when the SR is a positive SR, and the HARQ-ACK information has a length of 1 bit and a value of 0, the value of $m_{cs}^0$ is 3; and when the SR is the positive SR, and the HARQ-ACK information has a length of 1 bit and a value of 1, the value of $m_{cs}^0$ is 9, or wherein:

when the SR is a positive SR, and the HARQ-ACK information has a length of 2 bits and a value of {0, 0}, the value of $m_{cs}^0$ is 1;

when the SR is the positive SR, and the HARQ-ACK information has a length of 2 bits and a value of {0, 1}, the value of $m_{cs}^0$ is 4;

when the SR is the positive SR, and the HARQ-ACK information has a length of 2 bits and a value of {1, 1}, the value of $m_{cs}^0$ is 7; and when the SR is the positive SR, and the HARQ-ACK information has a length of 2 bits and a value of {1, 0}, the value of $m_{cs}^{0}$ is 10.

* * * * *